(12) United States Patent
Hermanson et al.

(10) Patent No.: US 7,416,308 B2
(45) Date of Patent: Aug. 26, 2008

(54) PANORAMIC MOTION PROJECTOR

(75) Inventors: Terry Hermanson, New York, NY (US); Huang Meng-Suen, Hong Kong (CN)

(73) Assignee: Mr. Christmas Inc., New York, NY (US)

( * ) Notice: Subject to any disclaimer, the term of this patent is extended or adjusted under 35 U.S.C. 154(b) by 298 days.

(21) Appl. No.: 11/058,261

(22) Filed: Feb. 16, 2005

(65) Prior Publication Data

US 2006/0181684 A1    Aug. 17, 2006

(51) Int. Cl.
*G03B 21/28*    (2006.01)

(52) U.S. Cl. .......................... 353/98; 353/51; 353/110; 353/119

(58) Field of Classification Search ............... 353/46, 353/47, 48, 49, 50, 51, 62, 79, 99, 110, 30, 353/119; 352/69, 70, 71
See application file for complete search history.

(56) References Cited

U.S. PATENT DOCUMENTS

| | | | | |
|---|---|---|---|---|
| 1,747,556 A | * | 2/1930 | Price ........................... | 40/431 |
| 3,063,334 A | * | 11/1962 | Smith ........................... | 353/34 |
| 3,240,113 A | * | 3/1966 | Stechemesser et al. ...... | 359/857 |
| 3,846,809 A | * | 11/1974 | Pinzone et al. ................. | 396/21 |
| 4,307,528 A | * | 12/1981 | Dewees et al. ................. | 40/433 |
| 6,145,228 A | * | 11/2000 | LaChance ..................... | 40/431 |
| 6,327,020 B1 | * | 12/2001 | Iwata ........................... | 352/69 |
| 6,409,351 B1 | * | 6/2002 | Ligon ........................... | 353/98 |
| 6,481,853 B2 | * | 11/2002 | Meng-Suen ................... | 353/35 |
| 6,695,452 B2 | * | 2/2004 | Panasewicz et al. .......... | 353/119 |
| 7,182,472 B2 | * | 2/2007 | Vitantonio et al. ............ | 353/99 |

* cited by examiner

*Primary Examiner*—William C. Dowling
(74) *Attorney, Agent, or Firm*—Fitzpatrick, Cella, Harper & Scinto (57) ABSTRACT

A projector includes a support structure, which supports a light source and an image medium. The image medium is arranged such that light from the light source passes through one or more images carried by the image medium, thereby projecting intermediate images. An image dispersion element, having a plurality of reflective surfaces, is mounted in fixed position in the path of the intermediate images, to simultaneously redirect the intermediate images in a plurality of different directions from the projector to create a plurality of final images. An image medium driver drives the image medium relative to the light source. As an image carried on the image medium moves in the path of light emitted by the light source, the intermediate images move relative to the image dispersion element, and, consequently the final images move across the surface onto which they are projected.

22 Claims, 7 Drawing Sheets

PANORAMIC MOTION PROJECTOR

BACKGROUND OF THE INVENTION

1. Field of the Invention

The present invention generally relates to projectors for projecting images onto a surface. More specifically, the present invention relates to projectors having an image dispersion element that simultaneously redirects an intermediate projected image in a plurality of different directions from the projector to produce a plurality of final images.

2. Discussion of the Related Art

Projectors for displaying images onto a surface are known. Such projectors are often used to display decorative images in either stationary positions or in motion. Projectors are also known that project multiples of the same or different images onto a surface. However, such conventional projectors can be relatively expensive to manufacture, due in part to the number and complexity of their moving parts.

For example, U.S. Pat. No. 6,695,452 to Panasewicz et al. discloses an open frame assembly that at one end mounts a projector and at an opposite end spaced from the projector mounts a rotating mirrored ball. When the mirrored ball is rotated, it simultaneously redirects images projected from the projector in many different directions. The projector may incorporate an image disk or wheel that carries translucent images about its periphery and that may also independently be driven for rotation to continuously change the image being projected to the mirrored ball. This arrangement is relatively complex and requires structure to mount and drive the mirrored ball in addition to structure to mount and drive the image wheel, thereby increasing the cost of the overall device. Moreover, the large number of moving parts and large open space between the projector and ball make such an arrangement more subject to malfunction and obstruction by an external source, particularly if the device is used out of doors. For example, a branch, ice, snow, an animal, or the like may become lodged between the mirrored ball and the projector, preventing the mirror ball from rotating, damaging the moving parts, or obstructing the projector.

U.S. Pat. No. 6,145,228 to LaChance discloses a projector, similar to that shown and described in the Panasewicz Patent, that includes a rotating mirrored ball operated in conjunction with a projector that projects a single image such as that of a single snowflake. The rotating ball then projects multiples of the single image.

The mirrored ball and structure for mounting and rotating it, and the projector and structure for mounting it are independent and in use are spaced from each other. Therefore, this arrangement may also be subject to malfunction and obstruction by external objects.

U.S. Pat. No. 6,481,853 to Meng-Suen, which is assigned to the assignee of the present invention, disclosed a projector that incorporates a film assembly for mounting a plurality of films carrying images, at least one of which is mounted for movement to project multiple relatively moving images.

While the projector disclosed in the Meng-Suen Patent has many advantageous features, there remains a need in the art for a projector that is inexpensive, and that eliminates these and other problems associated with conventional projectors of the type disclosed in the Panasewicz and La Chance Patents.

SUMMARY OF THE INVENTION

The present invention is directed to a projector for projecting images onto a surface, and remedies the foregoing as well as other deficiencies in the prior art.

In one aspect, the invention relates to a projector comprising a support structure, a light source, an image medium, an image dispersion element, and an image medium driver. The light source is supported by the support structure for emitting light along an optical axis. The image medium carries a plurality of images, and is supported by the support structure in the path of light emitted along the optical axis by the light source. Therefore, light from the light source may pass through an image carried by the image medium so as to project an intermediate image. The image dispersion element is mounted in fixed position by the support structure in the path of the intermediate image. The image dispersion element has a plurality of reflective surfaces that simultaneously redirect the intermediate image in a plurality of different directions from the projector to produce a plurality of final images. The image medium driver drives the image medium relative to the light source, such that at least some of the plurality of images carried on the image medium move into the path of light emitted by the light source, thereby projecting a plurality of intermediate images that move relative to the image dispersion element. The image dispersion element in turn simultaneously redirects the moving intermediate images in a plurality of different directions to produce a plurality of final moving images.

Preferably, the support structure comprises a housing having a base, a shroud, and a hinge pivotably connecting the base to the shroud for movement between an open position allowing access to the interior of the housing and the image medium, and a closed position in which the shroud is secured to the base at an edge opposite the hinge. The projector may also comprise a lamp assembly, which fits in a receptacle in the base, and to which the light source is mounted, the lamp assembly being removable for service and replacement of the light source. The lamp assembly may be electrically connected to the housing via engagement of terminals of the lamp assembly with terminals in the receptacle in the housing. In the preferred embodiment the operative components of the projector are all enclosed in or shielded by the housing.

In another aspect, the invention relates to a projector comprising a housing, a light source, an image disk, means for mounting the image disk, an image medium driver, and an image dispersion element. The light source is mounted in the housing. The image disk is mounted in the housing in front of the light source, and has a plurality of images formed along an arc thereof, such that light from the light source may pass through an image formed on the image disk to create an intermediate image. The means for mounting the image disk are provided in the housing for rotation about an axis, so that as the disk is rotated, light from the light source may serially pass through each of the images formed on the disk. The image medium driver rotates the image disk about the axis. The image dispersion element is mounted in fixed position in the housing in the path of the intermediate images. The image dispersion element has a plurality of fixed reflective surfaces that simultaneously redirect the intermediate images in a plurality of different directions from the projector to produce a plurality of final images.

In yet another aspect, the invention relates to a projector comprising a housing, a light source mounted in the housing, an image disk, means for removably mounting the image disk, an image dispersion element, a lens, a reflective surface, and an image medium driver. The image disk is mounted in the housing in front of the light source and has a plurality of images formed along an arc thereof, such that light from the light source may pass through an image formed on the image disk to create an intermediate image. The means for removably mounting the image disk mounts the image disk in the housing for rotation about an axis, so that as the disk is rotated, light from the light source may serially pass through each of the images formed on the image disk. The image dispersion element is mounted in fixed position on the housing in the path of the intermediate images, and comprises a convex surface and a plurality of planar, mirrored surfaces fixed to the convex surface. The plurality of planar, mirrored surfaces simultaneously redirect the intermediate images in a plurality of different directions to produce a plurality of final images. The lens is mounted in the housing, interposed between the image disk and the image dispersion element. The lens is mounted for movement along the path of the intermediate image to adjust the focus of the final images. The reflective surface mounted in the housing is interposed between the lens and the image dispersion element, to direct the intermediate image toward the image dispersion element. The image medium driver comprises an electric motor for driving the image disk relative to the light source, such that intermediate images formed by the image disk move relative to the image dispersion element and, consequently, the final images move on a surface onto which they are projected.

These and other features and advantages of the present invention will become apparent from the description of the preferred embodiments, with reference to the accompanying drawing figures.

BRIEF DESCRIPTION OF THE DRAWINGS

Throughout the drawings like or corresponding reference numerals denote like or corresponding features.

DETAILED DESCRIPTION OF THE PREFERRED EMBODIMENTS

Figure 1:
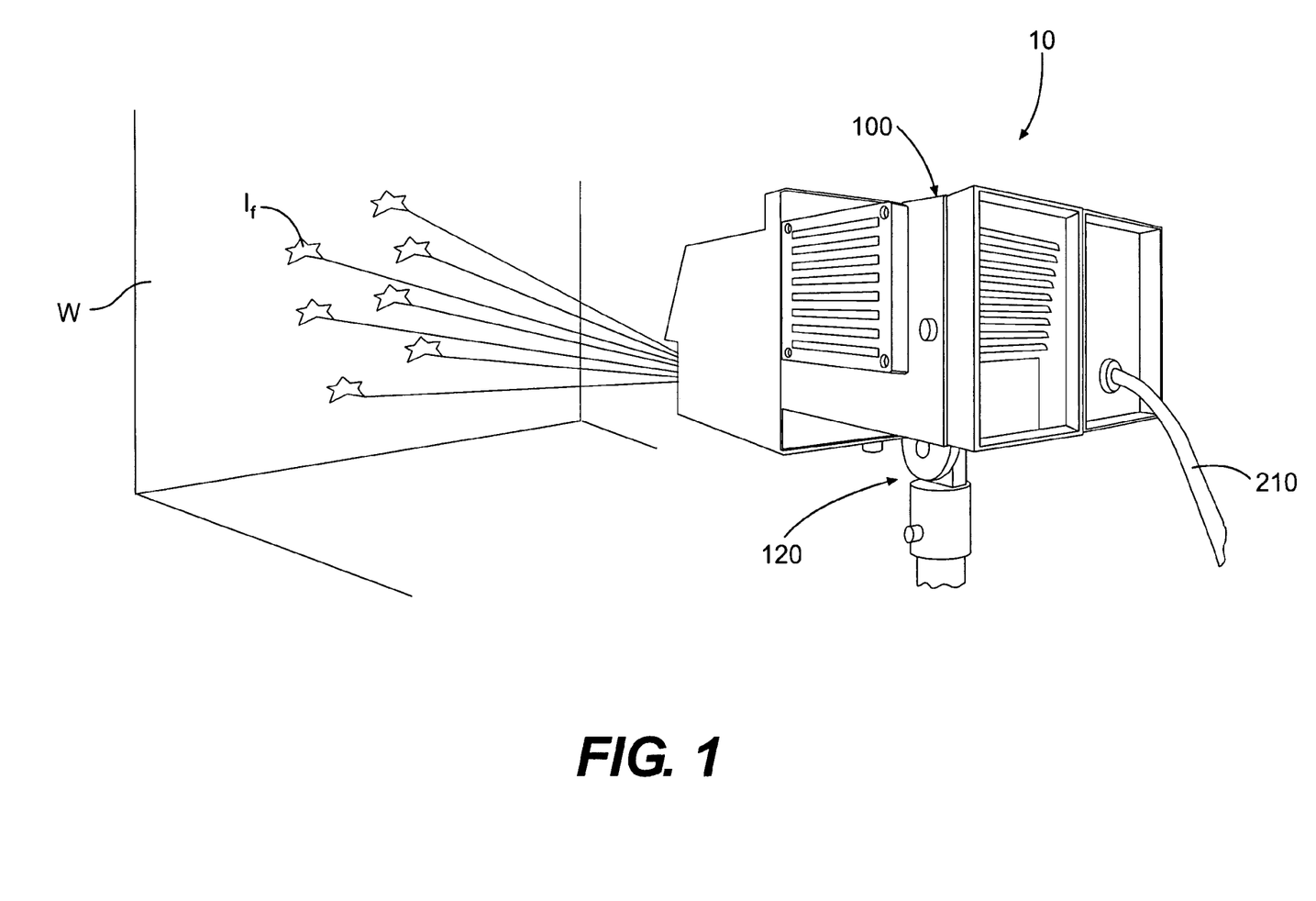
FIG. 1 is a rear perspective view showing a preferred embodiment of the projector of the present invention being used to project images onto a surface.

The present invention provides an inexpensive, reliable projector 10 that projects a plurality of final images onto a surface. A preferred embodiment of a projector 10 according to the present invention is illustrated in FIGS. 1 through 6. As shown in FIG. 1, the projector 10 is positioned to display a plurality of final images $I_f$ onto a wall W. The projector 10 comprises a support structure, which supports optical and electronic components of the projector 10. Preferably the support structure comprises a housing 100, which houses and protects the optical and electrical components of the projector 10. The housing can be made of any material that provides sufficient strength to support those optical and electrical components. Preferably, the housing material also provides protection for the optical and electrical components of the projector from the exterior elements. Suitable materials include fiberglass, plastics, such as polyurethane, acrylonitrile-butadiene-styrene (ABS), and the like, and formed metals, such as steel, aluminum, and the like. Other suitable materials will be readily apparent to those of ordinary skill in the art.

The projector 10 is supported by a mount 120, coupled to the bottom of the housing 100, that allows the projector, once positioned, to be pivoted to display the final images $I_f$ at different positions as desired by the user. A power cord 210 supplies electrical power, such as house current, to the projector. Of course, if desired, electrical power can be supplied by a self-contained source, like a battery, carried in the housing.

Figure 2:
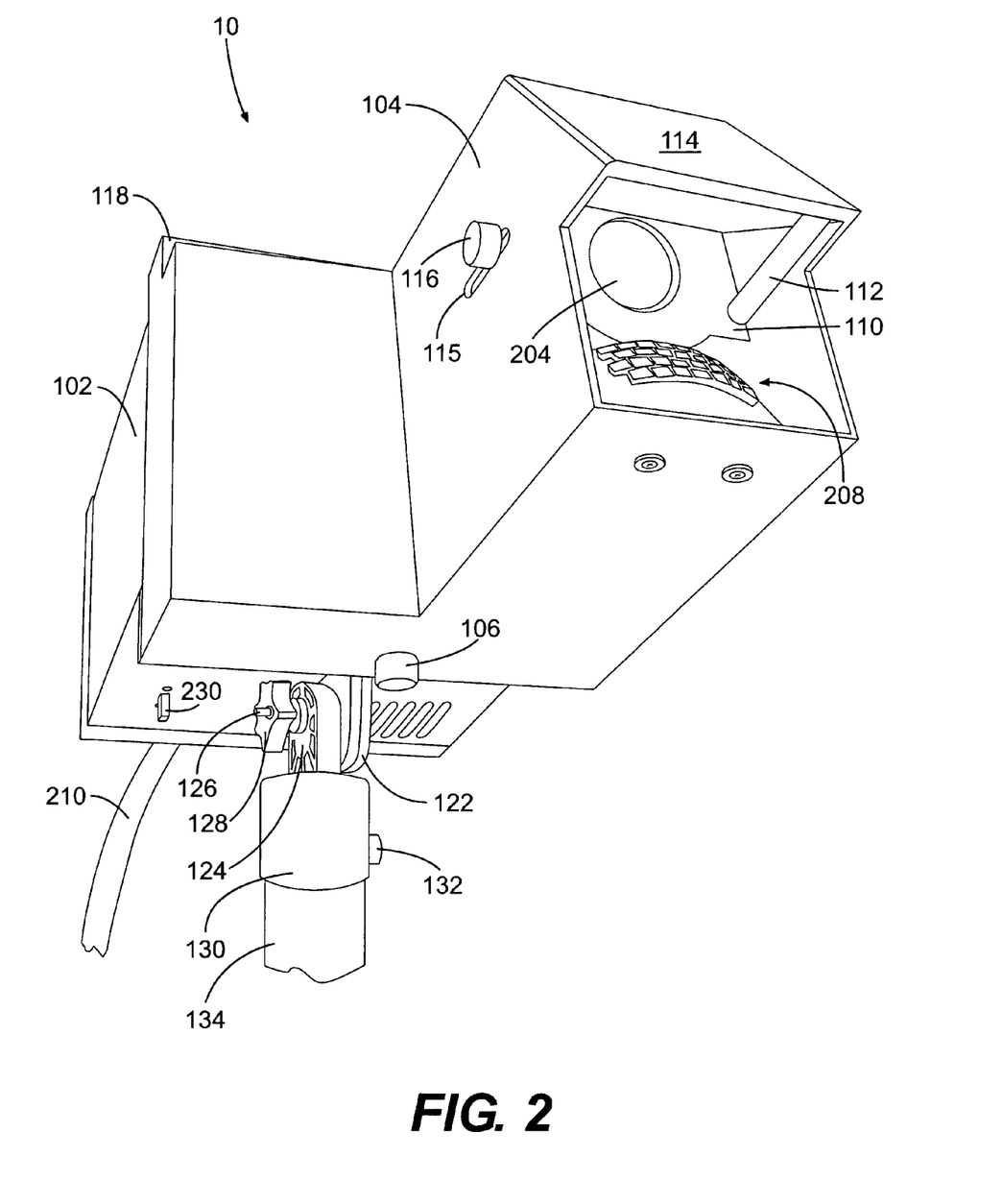
FIG. 2 is a front, perspective view of the projector of FIG. 1, showing the front and underside of the projector.
Figure 3:
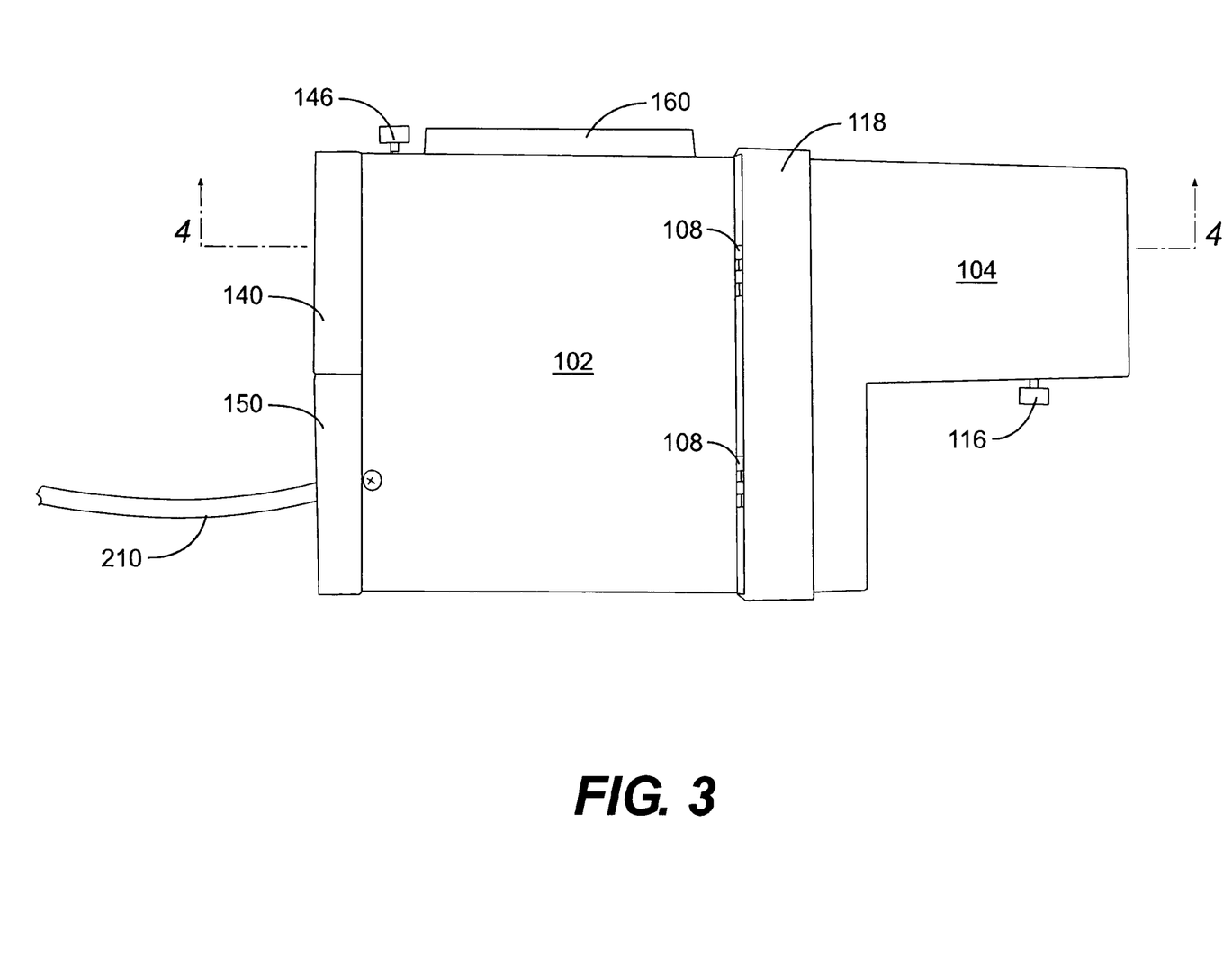
FIG. 3 is a top plan view of the projector of FIG. 1.

As best illustrated in FIGS. 2 and 3, the housing 100 of the projector comprises a base 102 and a shroud 104 pivotably connected to the base by a pair of hinges 108. The shroud 104 is pivotable about the hinges 108 between an open position, shown in FIGS. 5A and 5B, in which the interior of the housing is accessible, and a closed position, shown in FIGS. 1 through 4, in which the shroud 104 is secured to the base 102 on a side opposite the hinges 108 by a shroud fastener 106, such as a thumb screw, which engages a receptacle such as a threaded socket 107 in the base.

As shown in FIG. 2, the pivotable mount 120 comprises a mounting boss 122 coupled to or formed with the bottom of the base 102. A mounting tab 124 is pivotally coupled to the mounting boss 122 by a threaded through-bolt 126 and a thumb knob 128. The mounting tab 124 has a sleeve 130 at the free end thereof, which receives one end of a support shaft 134. The other end (not shown) of the support shaft 134 can be driven into the ground to support the projector 10 when it is used out of doors. Alternatively, the other end of the support shaft 134 may include one or more mounting feet or legs to support the projector 10, or a handle for hand-held support of the projector 10. A pin 132 protrudes through the sidewall of the sleeve 130 and engages a slot (not shown) in the support shaft 134 to align and retain the support shaft 134 in the sleeve 130.

With reference to FIG. 3, the projector 10 includes a lamp assembly 140 and a power supply assembly 150, both of which are received in the back portion of the base 102. The lamp assembly 140 is described in detail below with reference to FIG. 6. The power supply assembly 150 preferably includes a transformer, which, for example, converts alternating house current into the required voltage for use by the various electrical components of the projector.

Figure 4:
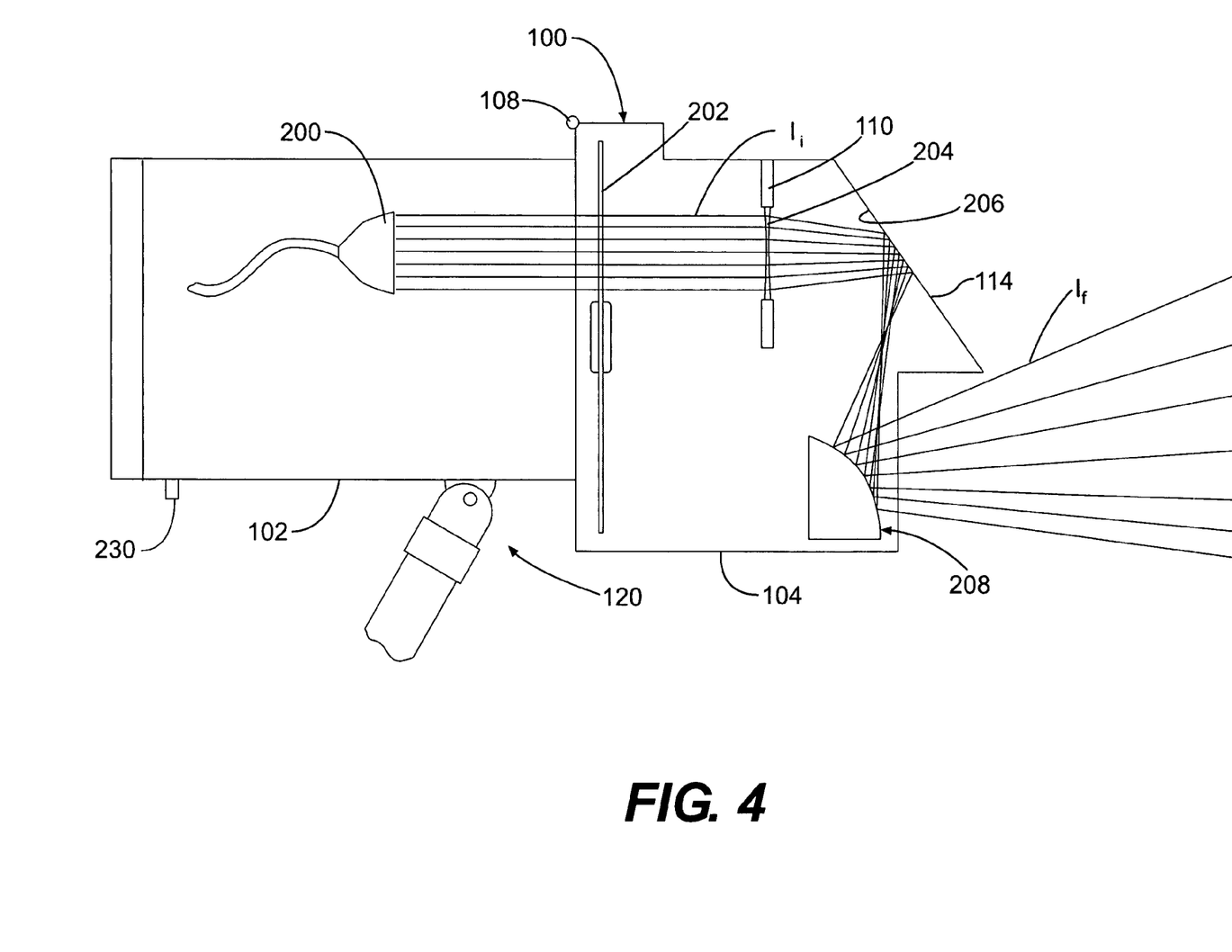
FIG. 4 is a schematic, cross-sectional view of the projector of FIG. 1, taken along plane 4-4 in FIG. 3.

FIG. 4 is a schematic cross-sectional view taken along plane 4-4 in FIG. 3, and depicts internal optical components of the projector used to generate the projected final image $I_f$. More particularly, a lamp 200 of the projector 10 emits light along an optical axis, generally toward the front of the projector 10. A window 170, shown in FIG. 5B, allows only that part of the light emitted from the lamp 200 that is traveling generally toward the front of the projector to pass, while masking the remaining light from the lamp 200. Alternatively, or additionally, light from the lamp 200 can be reflected and/or collimated by a suitable reflector and/or collimator (both not shown), so as to be directed substantially only toward the front of the projector.

Figure 5A:
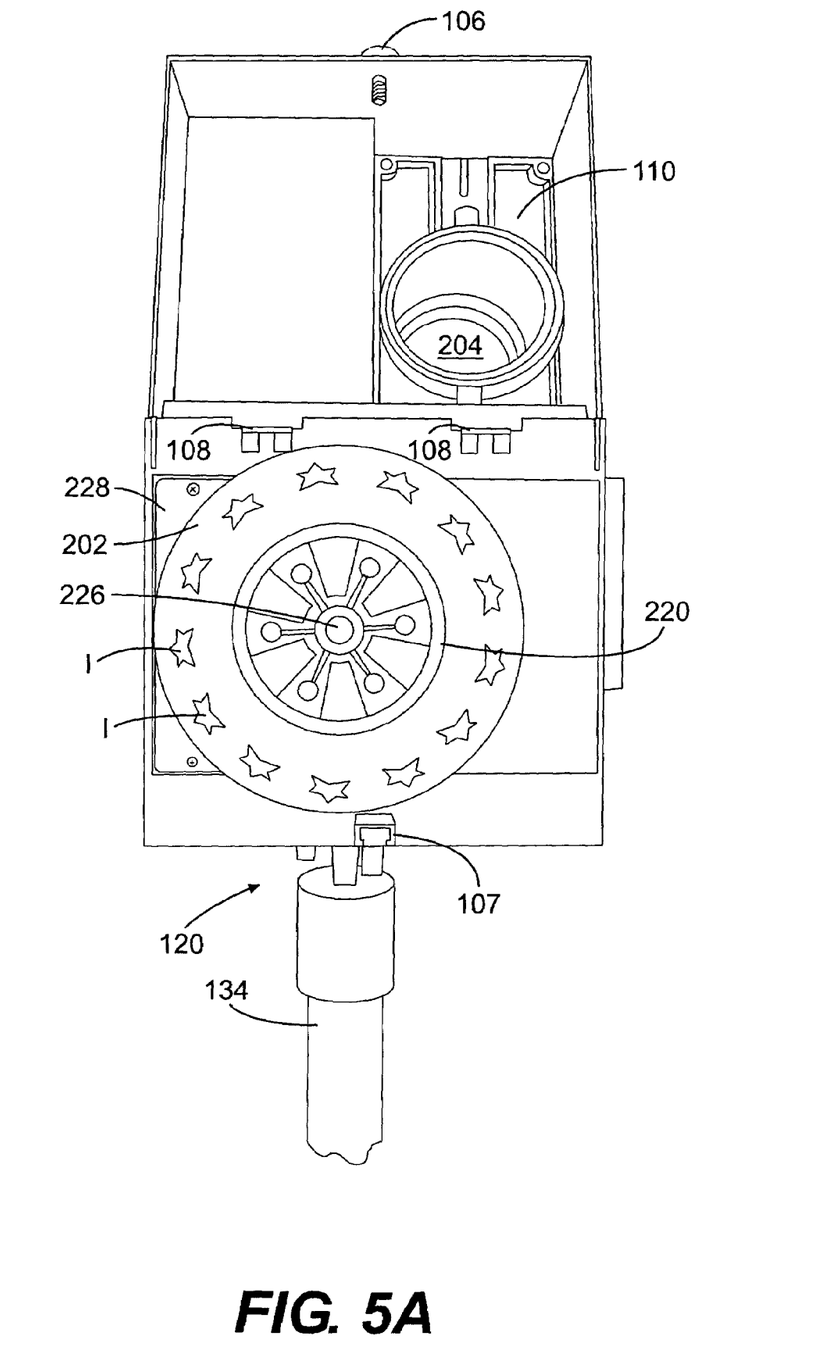
FIG. 5A is a front view of the projector of FIG. 1, with the front shroud of the housing pivoted to an open position to allow access to the interior of the housing.

An image medium 202 is positioned along the optical axis, in the path of the light emitted from the lamp 200. In the embodiment shown, the image medium 202 is an image disk having a plurality of images I (as shown in FIG. 5A formed in a circle or arc around a periphery thereof). The images I may be of the same or different depictions. Light passing through the image disk 202 forms one or more intermediate images $I_i$. The intermediate images $I_i$ then pass through a lens 204 positioned along the optical axis to focus the intermediate images $I_i$, before being reflected by a planar mirror 206, which folds the optical axis. The mirror 206 redirects the intermediate images $I_i$ along the folded optical axis toward an image dispersion element 208, which simultaneously redirects the intermediate images $I_i$ in a plurality of different directions from the projector to produce the plurality of final images $I_f$. The shroud 104 has a distended portion 118 at its top, to accommodate the image disk 202 within the housing 100.

The lamp 200 is preferably a conventional 12 Volt, 55 Watt, halogen lamp with a suitable reflector. However, one or more different lamps having a wide range of illumination angles, voltages, and wattage can instead be used, depending on such design considerations as power consumption, operating environment (for example, indoors or outdoors), heat emission, and the like. Also, other types of light sources may alternatively be used, such as incandescent bulbs, light emitting diodes, and the like, and such may emit white light or one or more different colors of light. These and other variations will be readily apparent to those of ordinary skill in the art.

Figure 5B:
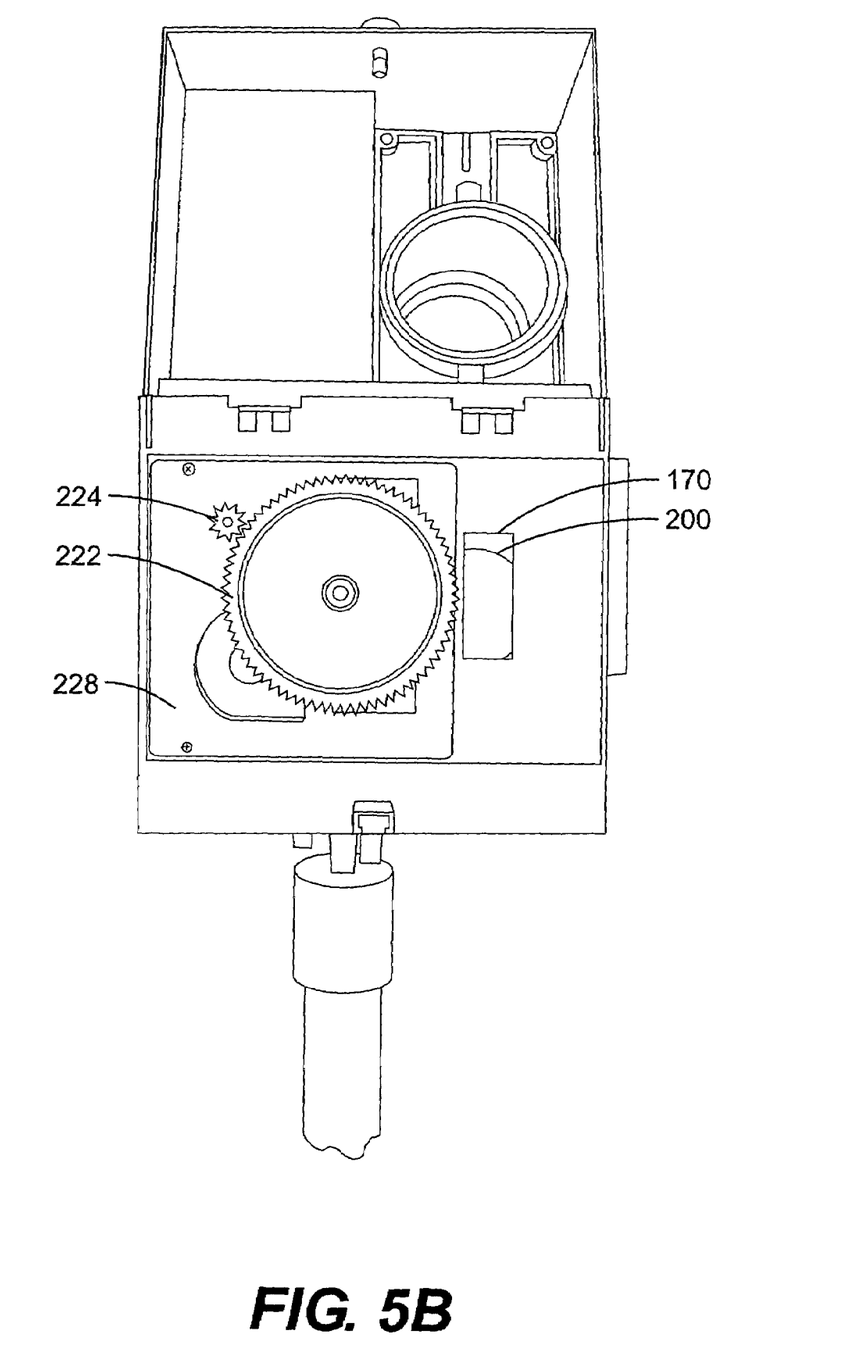
FIG. 5B is a front view of the projector of FIG. 1, with the front shroud of the housing pivoted to the open position to allow access to the interior of the housing, and with the image medium removed to better illustrate the structure of the image medium driver.

The image disk 202 is mounted within the housing 100, as best shown in FIGS. 5A and 5B, and is moved by an image medium driver. In the preferred embodiment, the image medium driver comprises a driven image disk gear 222, to which the image disk 202 is mounted, and which is driven for rotation by an electric motor (not shown) via a pinion drive gear 224. The image medium driver also preferably includes a belt reduction (not shown) between the electric motor and the pinion drive gear 224 to further reduce the speed of rotation of the image disk. The driven image disk gear 222, pinion drive gear 224, electric motor, and gear reduction are mounted to a drive plate 228 within the housing 100. Thus, when the projector is activated, the image medium driver rotates the image disk 202. A speed switch 230 is provided to adjust the speed at which the image disk 202 is rotated by the electric motor through suitable known circuitry (not shown).

While one preferred embodiment of an image medium driver is described, the image medium driver may be any mechanism capable of moving the image medium in the desired manner, and can be configured in many different ways. For example, the image medium driver could be manually powered, with the user actuating a knob or lever. Alternatively, the image medium could be driven by an electric motor directly (that is, without any gear or belt reduction), with the provision of a rheostat or other device to regulate the voltage supplied to the electric motor to achieve a desired speed of rotation. Numerous other types of image medium drivers will also be apparent to those of ordinary skill in the art.

The image disk 202 is held in place by a washer 220 and a retaining thumb screw 226 received in a threaded socket 227 carried by the driven gear 222. In use, when a user desires to change the image disk 202, the user merely has to open the shroud 104, and remove the retaining thumb screw 226 and washer 220. Other suitable mounting means for the image medium 202 may alternatively be used and, include, for example, one or more of screws, snap fasteners, adhesive, electrostatic forces, clamps, brackets, hook and loop fasteners, and the like.

As the image disk 202 is rotated by the image medium driver, the images I are moved in front of the window 170, where light from the light source shines through the image disk 202 and creates the intermediate images $I_i$. As will be described in more detail below, the moving intermediate images $I_i$ are focused by the lens 204 on the fixed mirrored dispersion element 208 after being reflected by the planar mirror 206. As the moving images I pass in front of the window 170, the the final images $I_f$ generated thereby, move across the surface W on which they are projected. Once each image I passes the window 170, light no longer shines through that particular image I, and the final image $I_f$ corresponding to that image I is no longer projected onto the surface W. Substantially simultaneously, however, one or more other images I will have moved, or will be beginning to move, into registry with the window 170 and projected on the surface W.

Preferably, the image disk 202 comprises a thin plastic disk, having images I formed around a periphery thereof. The images may be full pictures (for example, images having details in an interior of the image, as opposed to merely an outline), silhouettes, symbols, letters, words, graphics, shapes, colors, combinations of thereof, and the like. The images may be formed on the image medium by any known method, such as, for example, by application of one or more opaque and/or semi-opaque films, paints, dyes, or the like, by etching, by removing material in the image shape, by exposure of a film material, by masking off the image shape, or the like.

As best shown in FIGS. 2 and 4, the lens 204 is positioned along the optical axis in the path of the light from the lamp 200 by a lens mount 110. The lens mount 110 is slidable in a direction parallel to the optical axis along a lens guide 112, to adjust the focus of the final images $I_f$, in response to actuation of a lens adjuster 116 along a slot 115 by a user. The lens adjuster 116 is preferably threaded so that it can be locked into a desired position by the user to set the focus. Of course, other methods of setting and/or locking the lens adjuster may also be used, or the lens adjustment may be provided without any setting and/or locking feature.

The reflective surface 206 is best illustrated schematically in FIG. 4, and is positioned on an under surface of a brim 114 of the shroud 104. The planar mirror 206 is positioned at an oblique angle in the path of light initially projected by the lamp, so as to redirect the focused intermediate images $I_i$ along the folded optical axis toward the image dispersion element 208. The mirror 206 may comprise a separate mirror adhered to the underside of the brim 114, or may comprise a reflective film or coating applied to the underside of the brim 114.

The image dispersion element 208 is fixed to the shroud 104 in the path of the intermediate images $I_1$ reflected by the reflective surface 206. Preferably, the image dispersion element 208 comprises a partial convex dome formed on an interior bottom surface of the shroud 204, with at least a portion of the convex surface of the partial dome being covered with a plurality of mirrored surfaces or facets. Because the mirrored surfaces are mounted on the exterior of the partial dome, each mirrored surface is oriented at a slightly different angle, thereby reflecting the intermediate images $I_i$ outwardly from the image dispersion element 208 as a plurality of dispersed final images $I_f$. Because the image dispersion element 208 is fixedly mounted in the housing 100, there is no need for mounting and/or driving hardware that has previously been required by conventional projectors such as that disclosed in the Panasewicz and LaChance Patents. Accordingly, the complexity and cost of the projector is reduced. Also, because the image dispersion element 208 is fixed within the shroud 204, there is much less chance that an external object will interfere with or obstruct the structure for driving a dispersion element, such structure being eliminated in the present design.

Figure 6:
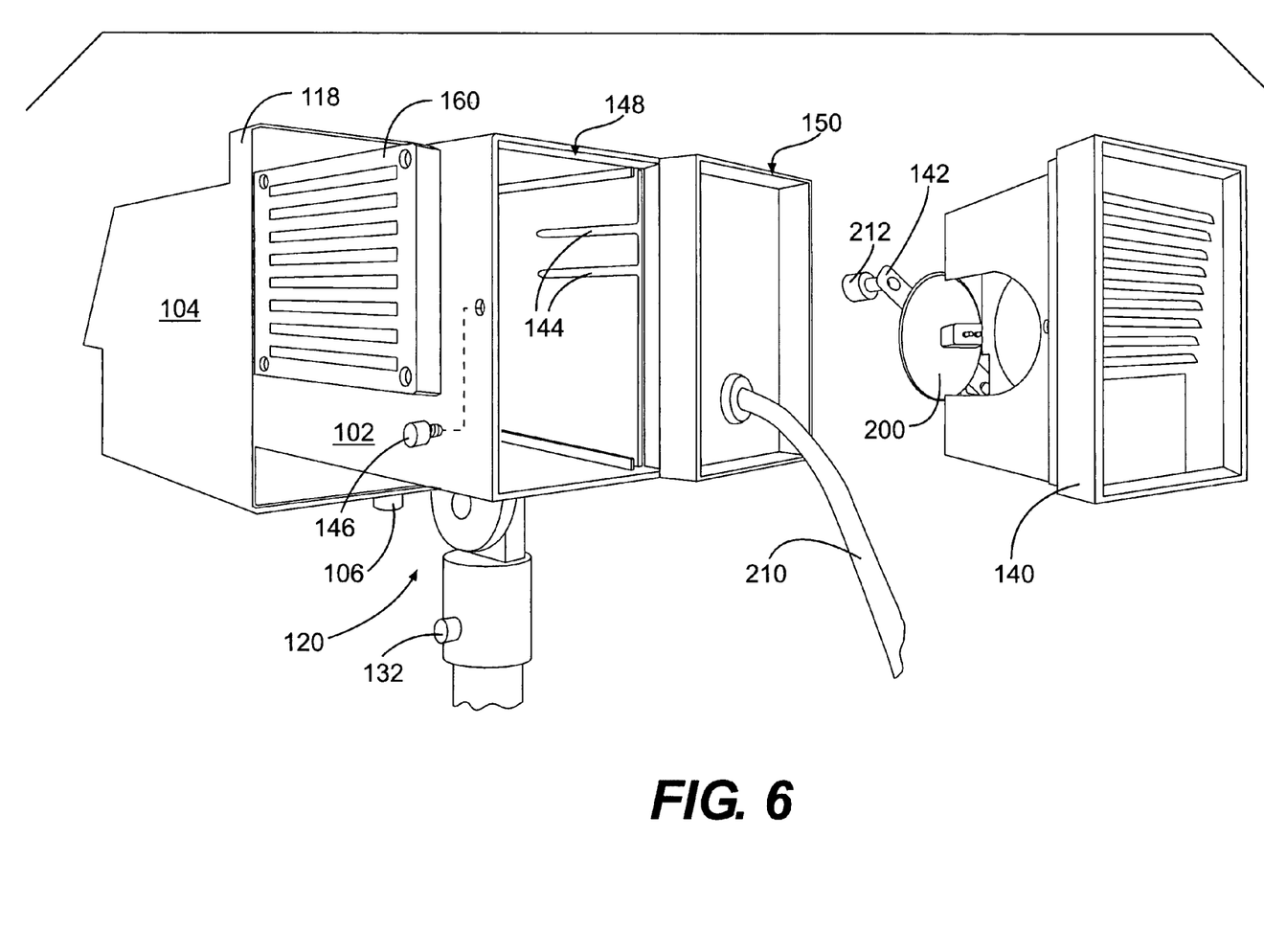
FIG. 6 is a rear, partial exploded view of the project of FIG. 1, showing the lamp assembly removed from the housing.

As shown in FIG. 6, the lamp 200 is mounted to the lamp assembly 140 by tabs 142, which fit over the rim of the lamp 200 and clamp the rim in place. The tabs 142 are secured with a pair of fasteners 212. The lamp assembly 140 fits in a receptacle 148 in the base 102, and is secured in place by a threaded lamp assembly retainer 146. The lamp assembly 140 is easily removable from the base 102 for service and replacement of the lamp 200 by simply unscrewing and removing the retainer 146. Electrical power is supplied to the lamp 200 from the power supply assembly 150 via terminals 144 inside the receptacle 148. The terminals 144 engage similar terminals (not shown) on the lamp assembly 144. (Of course, other electrical connection components may be used.) Louvers or vents are formed on the back side of the lamp assembly to allow air to circulate through the housing to vent heat generated by the lamp 200. Louvers are also formed on a side cover 160 provided on the side of the base 102 for the same purpose.

In operation, the user has merely to mount the projector 10 by inserting the support shaft 134 in the ground or otherwise mounting it, plug the power cord 210 into a wall socket for house current, and, using pivotal support 120, aim the projector 10 at a surface W on which images are to be displayed. Moving final images $I_f$ will then be projected onto the surface W. Adjustment of focus of the images $I_f$ may be performed using the lens adjuster 116 as described above. The user can set the speed of motion of the image disk 202, and hence the final images $I_f$, using speed switch 230.

While the invention is described in terms of the presently preferred embodiments, it is understood that features of these embodiments could be rearranged, interchanged, omitted, and/or combined to achieve other variations of the present invention, without departing from the spirit and scope of the present invention. For example, while a preferred arrangement is show defining an optical axis as shown in FIG. 4, the optical elements could be easily rearranged to define a different optical axis, to eliminate the need for one or more of the optical elements (e.g., the lens or the reflective surface), to shorten or lengthen the optical path within the device, to change the dispersion density or area of the final images, and the like.

Moreover, while the housing is shown as being a two-piece, hinged enclosed structure, the housing could readily be constructed of any number of different pieces (including a single-piece, unitary housing), depending on various design considerations, such as ease of maintenance, durability, manufacturing and assembly costs, and the like.

In another alternative, while the image medium is described as being an image disk, other types, shapes, and sizes of image media could instead be used, such as a slide with a single image, a linear strip or film with images formed along the length thereof, a roll with images formed along the length thereof, and the like. Also, instead of a plastic material, the image medium could be formed of any other suitable material that is capable of forming images by the transmission of light. In one particular alternative, the image medium could be a conventional liquid crystal display (LCD) medium, capable generating images to be projected. In that case, various additional circuitry, such as a processor, memory, and the like, would also be required to control the LCD medium. The provision of such circuitry would be within the purview of one of ordinary skill in the art.

Of course, if the image medium is other than an image disk, the image medium driver can be altered to accommodate the different image medium, or omitted if a single image medium is used. In one particular alternative, if a liner strip or roll were used as the image medium, the image medium driver could be constructed similar to a conventional film-advance mechanism in a film camera, and could be either manual or electrically advanced.

What is claimed is:

1. A projector comprising:
   a support structure;
   a light source supported by said support structure for emitting light along an optical axis;
   an image medium, carrying a plurality of images, supported by said support structure in the path of light emitted along the optical axis by said light source, such that light from said light source may pass through an image carried by said image medium thereby to project an intermediate image;
   an image dispersion element mounted in fixed position within said support structure in the path of the intermediate image, said image dispersion element having a plurality of reflective surfaces that simultaneously redirect the intermediate image in a plurality of different directions from the projector to produce a plurality of final images; and
   an image medium driver that drives said image medium relative to said light source, such that at least some of said plurality of images carried on said image medium move into the path of light emitted by said light source, thereby to project a plurality of intermediate images that move relative to said image dispersion element, which in turn simultaneously redirects the moving intermediate images in a plurality of different directions to produce a plurality of final moving images,
   wherein said image dispersion element redirects the intermediate images such that at least one of the plurality of final images is projected along an axis substantially parallel to the optical axis of the light source.

2. The projector according to claim 1, wherein said image dispersion element comprises a convex surface mounted in fixed position by said support structure and a plurality of mirrored surfaces mounted on said convex surface.

3. The projector according to claim 1, further comprising a lens, mounted by said support structure in the path of projected intermediate images between said image medium and said image dispersion element, thereby to focus the final images.

4. The projector according to claim 3, further comprising means for mounting said lens for movement relative to said support structure along the path of the intermediate image to adjust the focus of the final images.

5. The projector according to claim 4, further comprising a lens actuator accessible from said support structure and coupled to said lens, for adjusting the focus position of said lens.

6. The projector according to claim 1, further comprising a reflective surface disposed along the optical axis of said light source between said image medium and said image dispersion element, thereby to direct the intermediate image toward said image dispersion element.

7. The projector according to claim 1, further comprising a pivotable mount coupled to said support structure, said pivotable mount supporting the support structure and allowing said projector to be pivoted to display the final images at different positions.

8. The projector according to claim 1, further comprising means for removably mounting said image medium with said support structure.

9. The projector according to claim 1, wherein said image medium comprises a disk having a plurality of images formed along an arc thereon, and wherein said projector further comprises means for mounting said disk with said support structure for rotation about an axis, so that as said disk is rotated, light from said light source may serially pass through each of the plurality of images carried by said disk.

10. The projector according to claim 9, wherein said image medium driver comprises a motor that rotates said disk about its axis of rotation.

11. The projector according to claim 1, wherein said image medium is detachable from said support structure, such that the image medium can be replaced with different image media having different images.

12. The projector according to claim 1, wherein said support structure comprises a housing having a base, a shroud, and a hinge to pivotably connect said base to said shroud for movement between an open position allowing access to the interior of said housing and said image medium, and a closed position in which said shroud is secured to said base at an edge opposite said hinge.

13. The projector according to claim 12, further comprising a lamp assembly, which fits in a receptacle in the base, and to which said light source is mounted, said lamp assembly being removable for service and replacement of said light source.

14. The projector according to claim 13, said housing comprising electrical terminals and said lamp assembly also comprising electrical terminals couplable to said housing terminals to electrically couple said lamp assembly to a power source.

15. A projector according to claim 1, wherein the support structure is enclosed.

16. A projector comprising:
a housing;
a light source mounted in said housing and emitting light along an optical axis;
an image disk mounted in said housing in front of said light source and having a plurality of images formed along an arc thereof, such that light from said light source may pass through an image formed on said image disk to create an intermediate image;
means for mounting said image disk in said housing for rotation about an axis so that as said disk is rotated, light from said light source may serially pass through each of said images formed on said image disk;
an image medium driver for rotating said image disk about the axis; and
an image dispersion element mounted in fixed position in said housing in the path of the intermediate image, said image dispersion element having a plurality of fixed reflective surfaces that simultaneously redirect the intermediate image in a plurality of different directions from the projector to produce a plurality of final images,
wherein said image dispersion element redirects the intermediate image such that at least one of the plurality of final images is projected along an axis substantially parallel to the optical axis of the light source.

17. A projector comprising:
a housing;
a light source mounted in said housing and emitting light along an optical axis;
an image disk mounted in said housing in front of said light source and having a plurality of images formed along an arc thereof, such that light from said light source may pass through an image formed on said image disk to create an intermediate image;
means for removably mounting said image disk in said housing for rotation about an axis, so that as said disk is rotated, light from said light source may serially pass through each of said images formed on said image disk;
an image dispersion element mounted in fixed position within said housing in the path of the intermediate image and comprising a convex surface, a plurality of planar, mirrored surfaces fixed to said convex surface that simultaneously redirect the intermediate image in a plurality of different directions to produce a plurality of final images;
a lens, mounted in said housing interposed between said image disk and said image dispersion element, said lens mounted for movement along the path of the intermediate image to adjust the focus of the final images;
a reflective surface, mounted in said housing interposed between said lens and said image dispersion element, to direct the intermediate image toward said image dispersion element; and
an image medium driver comprising an electric motor for driving said image disk relative to said light source, such that intermediate images formed by said image disk move relative to said image dispersion element and, consequently, the final images move on a surface to which they are projected,
wherein said image dispersion element redirects the intermediate image such that at least one of the plurality of final images is projected along an axis substantially parallel to the optical axis of the light source.

18. The projector according to claim 17, further comprising means for moving said lens, accessible from the exterior of said housing, thereby to adjust the focus position of said lens.

19. The projector according to claim 18, further comprising a lamp assembly, which fits in a receptacle in the base, and to which said light source is mounted, said lamp assembly being removable for service and replacement of the light source.

20. The projector according to claim 19, said lamp assembly being in electrical communication with said housing via engagement of terminals of the lamp assembly with terminals in the receptacle in said housing.

21. A projector comprising:
a support structure;
image generating means, supported by said support structure, for generating a plurality of moving intermediate images and projecting the moving intermediate images along an optical path, said image generating means including a light source emitting light along an optical axis; and
an image dispersion element mounted in fixed position within said support structure in the optical path of the projected moving intermediate images generated by said image generating means, said image dispersion element having a plurality of fixed reflective surfaces that simultaneously redirect the projected moving intermediate images in a plurality of different directions from the projector to produce a plurality of final moving images,
wherein said image dispersion element redirects the intermediate images such that at least one of the plurality of final images is projected along an axis substantially parallel to the optical axis of the light source.

22. A projector according to claim 21, wherein the support structure is enclosed.

* * * * *